United States Patent
Yuval et al.

(10) Patent No.: US 9,210,106 B2
(45) Date of Patent: Dec. 8, 2015

(54) COMMUNICATION DEVICE FOR WIDEBAND CODE DIVISION MULTIPLE ACCESS COMMUNICATION (W-CDMA) SYSTEM, A METHOD FOR USE THEREIN AND AN ASSOCIATED SEMICONDUCTOR DEVICE

(71) Applicants: Neeman Yuval, Mazkeret Batia (IL); Bar-Or Amit, Nes-Ziona (IL); Bezalel Kfir, Holon (IL); Shahar Yoel, Netanya (IL); Zach Noam, Ganey Tikva (IL)

(72) Inventors: Neeman Yuval, Mazkeret Batia (IL); Bar-Or Amit, Nes-Ziona (IL); Bezalel Kfir, Holon (IL); Shahar Yoel, Netanya (IL); Zach Noam, Ganey Tikva (IL)

(73) Assignee: Freescale Semiconductor, Inc., Austin, TX (US)

(*) Notice: Subject to any disclaimer, the term of this patent is extended or adjusted under 35 U.S.C. 154(b) by 312 days.

(21) Appl. No.: 13/933,695

(22) Filed: Jul. 2, 2013

(65) Prior Publication Data

US 2015/0009983 A1   Jan. 8, 2015

(51) Int. Cl.
*H04B 1/707* (2011.01)
*H04L 12/861* (2013.01)
*H04B 1/7117* (2011.01)

(52) U.S. Cl.
CPC .............. *H04L 49/90* (2013.01); *H04B 1/7117* (2013.01)

(58) Field of Classification Search
CPC ...... H04B 1/7117; H04B 1/707; H04B 7/216; H04L 2012/5676; H04L 2012/6459; H04L 49/90; H04J 2203/0092; H04J 2011/0006; H04J 13/00; H04M 15/825; H04Q 2213/13294
USPC ......... 370/252, 310, 350, 335–336, 329, 342, 370/398, 412, 441, 447; 375/146–150, 371; 455/69, 135, 522, 553.1
See application file for complete search history.

(56) References Cited

U.S. PATENT DOCUMENTS 6,556,634 B1   4/2003 Dent
6,570,918 B1   5/2003 Rademacher
(Continued)

FOREIGN PATENT DOCUMENTS

KR   10-1068058 B1   9/2011
WO   02052743 A2   7/2002

OTHER PUBLICATIONS

International Search Report and Written Opinion for International Application No. PCT/IB2012/053384, 11 pages. ISR dated Mar. 4, 2013.

*Primary Examiner* — Charles C Jiang
*Assistant Examiner* — Mohamed Kamara

(57) ABSTRACT

A communication device (1) for a wideband code division multiple access communication (W-CDMA) system is described. The communication device has an antenna interface (AIF), a front end processor (FE), a packet generator (PG), a packet writer (PW) and one or more digital signal processors (DSP1, DSP2). The front end processor (FE) is configured to receive one or more antenna signals from the antenna interface (AIF) and to calculate soft symbols representing symbols transmitted by a UE (UE0, UE1) using descrambling and despreading of the one or more antenna signals using a plurality of fingers assigned to the UE. The packet generator (PG) is configured to organize the soft symbols into packets, each packet comprising the soft symbols from the plurality of fingers assigned to a respective UE associated with one physical channel of the one of more physical channels and with the same symbol index. The packet writer (PW) is configured to write the packets into a system memory (SYSMEM). The one or more digital signal processors (DSP1, DSP2) are configured to access the packets from the system memory (SYSMEM) and to process the packets.

20 Claims, 8 Drawing Sheets

(56) References Cited

U.S. PATENT DOCUMENTS

| | | |
|---|---|---|
| 6,714,585 B1 | 3/2004 | Wang et al. |
| 6,718,162 B1* | 4/2004 | Agin ................. H04B 1/71075 370/342 |
| 6,865,169 B1* | 3/2005 | Quayle ................ H04L 63/083 370/335 |
| 7,307,977 B1 | 12/2007 | Eran et al. |
| 2002/0037028 A1* | 3/2002 | Baltersee ............. H04B 1/7085 375/148 |
| 2011/0002232 A1* | 1/2011 | Niewczas ............ H04B 1/7085 370/252 |
| 2012/0082197 A1* | 4/2012 | Jonsson ................ H04B 1/712 375/224 |

\* cited by examiner

PDB

| | | |
|---|---|---|
| Base001 | FIN0  A | |
| | FIN1  A | UE0 |
| | FIN2  A | PCH0 |
| | FIN3 | P1 |
| | FIN0  E | |
| | FIN1  E | UE0 |
| | FIN2  E | PCH1 |
| | FIN3 | P1 |
| Base011 | FIN4  X | UE1 |
| | FIN5 | PCH0 |
| | FIN6  X | P1' |
| | FIN4  U | UE1 |
| | FIN5 | PCH1 |
| | FIN6  U | P1' |
| Base002 | FIN0  B | |
| | FIN1 | UE0 |
| | FIN2 | PCH0 |
| | FIN3 | P2 |
| | FIN0  F | |
| | FIN1 | UE0 |
| | FIN2 | PCH1 |
| | FIN3 | P2 |

Fig. 4a

| | | |
|---|---|---|
| Base001 | FIN0 A | |
| | FIN1 A | UE0 PCH0 P1 |
| | FIN2 A | |
| | FIN3 A | |
| | FIN0 E | |
| | FIN1 E | UE0 PCH1 P1 |
| | FIN2 E | |
| | FIN3 E | |
| Base011 | FIN4 X | |
| | FIN5 X | UE1 PCH0 P1' |
| | FIN6 X | |
| | FIN4 U | |
| | FIN5 U | UE1 PCH1 P1' |
| | FIN6 U | |
| Base002 | FIN0 B | |
| | FIN1 B | UE0 PCH0 P2 |
| | FIN2 B | |
| | FIN3 | |
| | FIN0 F | |
| | FIN1 F | UE0 PCH1 P2 |
| | FIN2 F | |
| | FIN3 | |
| Base012 | FIN4 | |
| | FIN5 | UE1 PCH1 P2' |
| | FIN6 Y | |
| | FIN4 | |
| | FIN5 | UE1 PCH1 P2' |
| | FIN6 V | |

Fig. 4b

PGT

| | | |
|---|---|---|
| UE0 | Base001: 3 | P1 |
| | Base002: 1 | P2 |
| UE1 | Base011: 2 | P1' |
| | NULL:0 | |

PGT

| | | |
|---|---|---|
| UE0 | NULL: 0 | P1 |
| | NULL: 0 | P2 |
| UE1 | Base011: 3 | P1' |
| | Base012: 1 | P2' |

PHF

WP_PHF →

PHF

| |
|---|
| PDBbase(UE0, P1) = Base001, UE0, 4, Evt_typ0 |
| PDBbase(UE1, P1') = Base011, UE1, 3, Evt_typ1 |
| |

WP_PHF →

ED
| TYPE | UEID | WP0 | WP1 | WP2 | WP3 | WP4 | WP5 |
Fig. 7
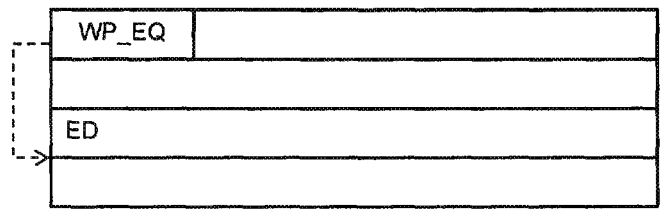
Fig. 8
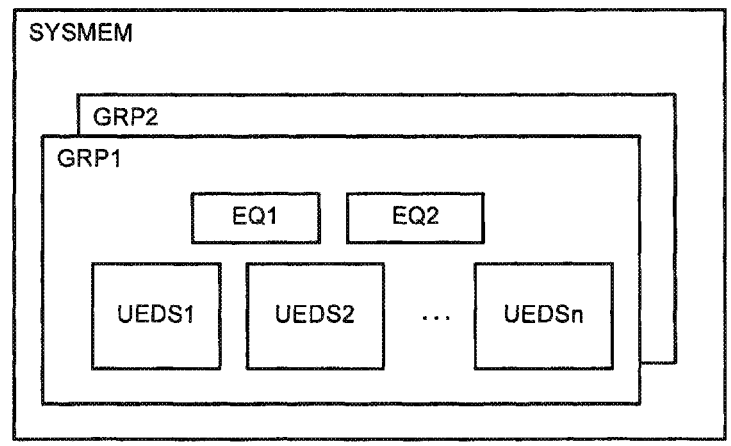
Fig. 9

COMMUNICATION DEVICE FOR WIDEBAND CODE DIVISION MULTIPLE ACCESS COMMUNICATION (W-CDMA) SYSTEM, A METHOD FOR USE THEREIN AND AN ASSOCIATED SEMICONDUCTOR DEVICE

FIELD OF THE INVENTION

This invention relates to a communication device for wideband code division multiple access communication (W-CDMA) system, a method for use therein and an associated semiconductor device.

BACKGROUND OF THE INVENTION

In wideband code division multiple access communication (W-CDMA), a User Equipment (UE) employs scrambling and spreading of symbols before being transmitting the symbols to be able to use the same frequency and time domains for different users and different physical channels (PCHs). Hereto, the UE uses a scrambling code assigned by a base station (BS) and applied over a frame of 38400 chips, and a spreading code applied over a number of chips referred to as a spreading factor. In W-CDMA, each frame is divided in 15 slots, each slot is divided in 10 sub-slots and each sub-slot comprises 256 chips. In W-CDMA, the spreading factor is typically 256 for control channels, thus each UE transmits a symbol using 256 chips multiplied with the scrambling code and the spreading code.

The base station may receive multiple reflections of the signal transmitted by the UE with time delays depending on the roundtrip that each reflection has experienced while getting from the UE to the BS. The base station separates these reflections out of the antenna signal from assigning a number of fingers to each UE, with the number of fingers reflecting the number of reflections received in the base station. Hereto, the base station uses a procedure commonly referred to as path search to find the number of reflections and their time offsets. Each finger despreads and descrambles the antenna signal using the spreading code assigned to a PCH and scrambling code assigned to a UE and the respective time offset to obtain, for each finger, a soft symbol associated with the transmitted symbol. The base station then accumulates the transmission received in each of the fingers, i.e., combines the soft symbols of all the fingers, using, for example, maximal-ratio combining (MRC), to reconstruct the symbol as transmitted with a low error rate.

In prior art systems, the base station has a front end processor arranged to perform the descrambling and dispreading with the assigned number of fingers and a digital signal processor which processes the soft symbols of all assigned fingers to reconstruct the symbol as transmitted. Hereto, the prior art front end processor writes the soft symbols in a plurality of cyclic buffers, one for each finger, in a system memory and the digital signal processor retrieves the soft symbols from the cyclic buffers on the system memory for further processing. Memory management and scheduling may be quite complex. For example, both the front end processor as well as the digital signal processor need to keep track which fingers are assigned to which UE, which may change over time, a bookkeeping of use read and write pointers for each cyclic buffer (for each finger and, possibly, for each UE), and need to handle possibly large delay spreads between fingers assigned to a single UE. Such large delay spread may e.g. result in a soft symbol of a late finger arriving in the system memory only after a next soft symbol of an early finger has arrived. This may e.g. lead to an inefficient scheduling of memory access and/or a high cache miss rate by the digital signal processor.

SUMMARY OF THE INVENTION

The present invention provides a communication device for a wideband code division multiple access communication (CDMA) system, a method for use therein, a computer program product and a semiconductor device as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

FIG. 4a and FIG. 4b show an example of parts of a packet data buffer PDB at two snapshot moments;

FIG. 7 shows an exemplary structure of an example of an event descriptor ED;

FIG. 8 schematically shows an example of an event queue EQ;

FIG. 9 shows an example of UE groups in system memory SYSMEM; and

DETAILED DESCRIPTION OF THE PREFERRED EMBODIMENTS

Figure 1:
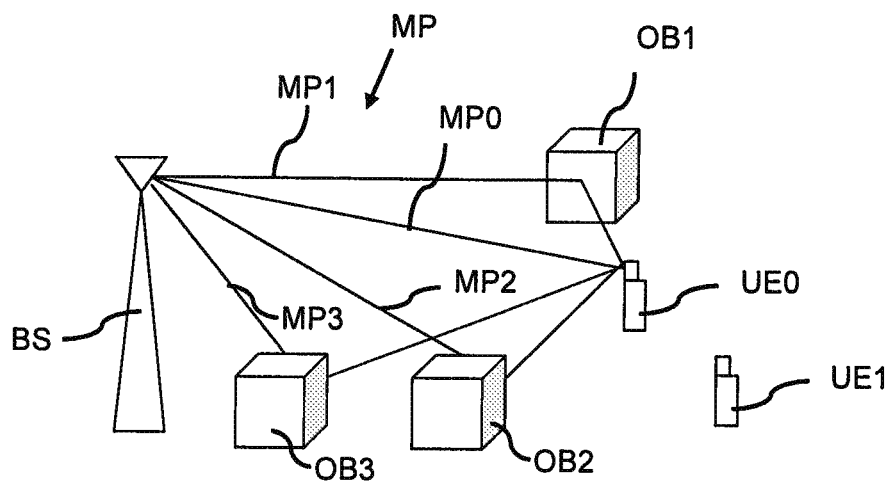
FIG. 1 schematically shows an overview of a W-CDMA system.

FIG. 1 schematically shows an overview of a W-CDMA system. FIG. 1 shows a base station BS, a first UE UE0, a second UE UE1 and three objects OB1, OB2, OB3. FIG. 1 further shows that UE UE0 is transmitting a signal which is received by the base station BS via a plurality MP of paths. The plurality of paths comprises a direct path MP0 along the line of sight from the UE UE0 to the base station BS, as well as three reflections MP1, MP2, MP3 along which the signal experiences reflections on the objects OB1, OB2, OB3. As each path MP0, MP1, MP2, MP3 has a different length, the reflections are received by the base station with different delay and, possibly, with different phase shifts. The plurality of paths may further be referred to as a plurality of reflections. The base station assigns a plurality of fingers to each UE to despread and descramble its received signals depending on detected reflections according to a channel estimation procedure. The UEs UE0, UE1 use spreading and scrambling. The spreading allows a UE to transmit multiple physical channels concurrently whole allowing to distinguish between different physical channels of the same UE in the base station. For example, the UE can transmit a Dedicated Physical Control Channel (DPCCH) and a Dedicated Physical Data Channel (DPDCH) at the same time, such that PILOT symbols of the DPCCH channel can be used to execute channel estimation in the base station and, for example, maximum ration combining (MRC) on data symbols of the DPDCH channel. The skilled person will appreciate that, since DPCCH and DPDCH transmitted at the same time they use exactly the same fingers. Thus, a scrambling code is used to distinguish between the different UEs UE0, UE1 and the spreading code is used to distinguish between different PCHs of the same UE. In the UE side, the UE first spreads all physical channels (PCHs) using the spreading code and then combines them such that the spread message is a superposition of multiple PCHs. Then, the UE scrambles the message with a unique scrambling code and transmits it on air.

Figure 2:
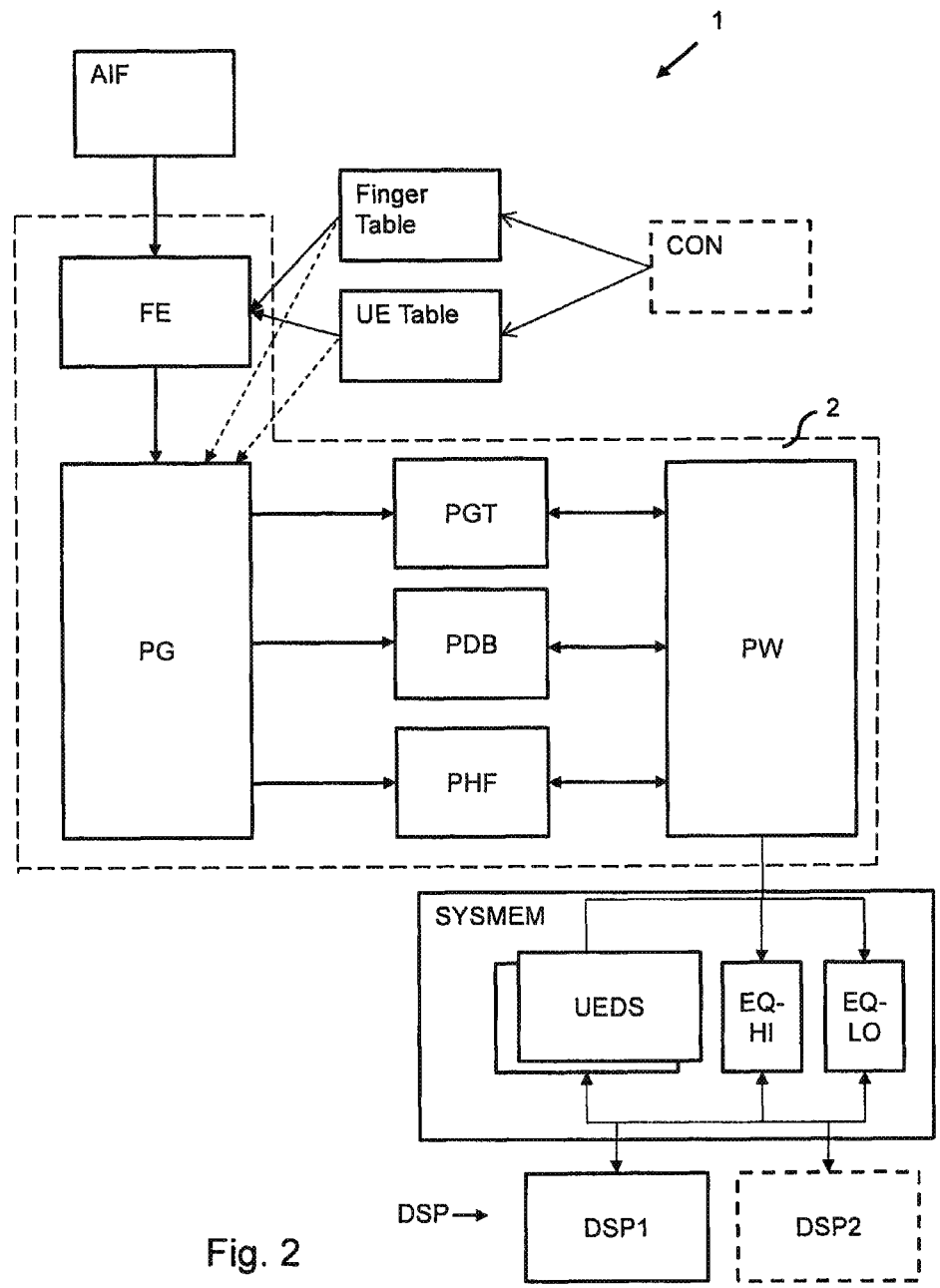
FIG. 2 schematically shows a communication device 1 according to an embodiment for a W-CDMA system.

FIG. 2 schematically shows a communication device 1 according to an embodiment for a W-CDMA system. The communication device 1 may be a base station BS. The communication device 1 may alternatively be another device communicating with multiple UEs. The communication device 1 comprises an antenna interface AIF, a controller CON, a front end processor FE, a packet generator PG, a packet writer PW, one or more digital signal processors DSP1, DSP2. In the following, the one or more digital signal processors DSP1, DSP2 may together be referred to as 'digital signal processor DSP'. The one or more digital signal processors DSP1, DSP2 may comprise a first digital signal processor DSP1 and the second digital signal processor DSP2, as shown in FIG. 1. First digital signal processor DSP1 and second digital signal processor DSP2 may also be referred to as 'digital signal processor' and 'further digital signal processor'. The one or more digital signal processors may, in another example, be a single digital signal processors DSP1. The antenna interface AIF is configured to receive an antenna signal comprising a superposition of a plurality of reflections of a signal transmitted by one or more UEs. The signal transmitted by a UE comprises scrambled and spreaded symbols associated with one or more physical channels, such as a Dedicated Physical Control Channel (DPCCH channel) and a Dedicated Physical Data Channel (DPDCH). The antenna interface AIF is further configured to provide the antenna signal to the front end processor FE. The antenna interface AIF may be configured to receive one or more antenna signals comprising a superposition of a plurality of reflections of the signal transmitted by one or more UEs such that different reflections of a UE signal may be received by different antennas. As indicated in FIG. 2, the front end processor FE, the packet generator PG and the packet writer PW may be integrated in a semiconductor device 2. The combination of front end processor FE, the packet generator PG and the packet writer PW may be referred to as a chip-rate processor.

The controller CON is configured to determine a number of fingers corresponding to the plurality of reflections and to assign a plurality of fingers to the UE in accordance with the number. The controller CON hereto provides information on the assignment in a Finger table, indicating the assignment of fingers per UE. Further, the controller CON provides a UE table, indicating attributes specific for each UE, such as the spreading code and scrambling code for each UE, and, e.g., the physical channels used by the UE. The controller CON may, e.g., be provided as a functional unit in the digital signal processor DSP. The controller CON may comprise, or cooperate with, a dedicated hardware circuitry arranged to perform a path search to determine the plurality of reflections.

The controller CON may obtain the attributes for each UE from the DSP or from the dedicated hardware circuitry, and provide the attributes for each UE in the UE table for use by the front end processor FE.

The front end processor FE is configured to receive the antenna signal and to calculate soft symbols representing the symbols transmitted by the UE using descrambling and despreading of the antenna signal using the plurality of fingers assigned to the UE. Each soft symbol is associated with a respective symbol index, UE identifier, finger index and physical channel. The front end processor FE is configured to provide the soft symbols to the packet generator PG.

The packet generator PG is configured to receive the soft symbols from the front end processor FE and to organize the soft symbols into packets. Each packet comprises the soft symbols from the plurality of fingers assigned to a respective UE, associated with one physical channel of the one or more physical channels and with the same symbol index. Thus, the soft symbols from multiple fingers corresponding to a single transmitted symbol are collected by the packet generator and organized in one packet.

The packet writer PW is configured to write the packets into a system memory SYSMEM.

The digital signal processor DSP is configured to access the packets from the system memory SYSMEM and to process the packets. Thus, the digital signal processor can, by retrieving one of the packets, directly retrieve all soft symbols associated with one transmitted symbol. This allows an efficient processing by the DSP.

FIG. 2 further shows that the packet generator PG uses a packet data buffer PDB, a packet header fifo PHF, and a packet generation table PGT to organize the soft symbols into packets and to make the packets available to the packet writer PW. Hereto, the packet generator PG, in organizing the soft symbols into packets, is configured to allocate a first buffer space in the packet data buffer PDB according to the assigned number of fingers upon receiving a first soft symbol of a first packet. The first packet is thus "opened". The packet generator PG is further configured to write the soft symbols of the first packet in the first buffer space of the packet data buffer PDB until the first packet is complete. The first packet is complete once the soft symbols of all assigned fingers have been written into the first packet.

The packet generator PG is further configured to indicate access information of the first buffer space of the packet data buffer PDB in the packet header fifo PHF upon completing the writing of soft symbols into the first buffer space of the packet data buffer PDB. The packet writer PW is configured to read the access information from the packet header fifo PHF, to read the first packet from the first buffer space using the access information and to write the first packet in the system memory SYSMEM. The access information may e.g. comprise the location of the first packet in the packet data buffer PDB, for example by indicating a base address of the first buffer space and its size (e.g. corresponding to the number of fingers assigned). The packet writer PW can thus obtain the first packet, as soon as it is complete, from the packet data buffer PDB. The access information may further indicate which physical channel the packet relates to and/or a symbol descriptor, as will be described below.

The packet generator PG is further configured to allocate a second buffer space in the packet data buffer PDB upon a first receipt of a soft symbol of a second packet, to write the soft symbols of the second packet in the second buffer space of the packet data buffer PDB until the second packet is complete and to indicate status information representing the status of the first buffer space and the second buffer space in the packet generation table PGT. Thus, the packet generator may "open" a second packet while the first packet is not yet complete, and the completing of the first packet may continue while also the second packet is being filled.

FIG. 2 further shows that the system memory SYSMEM may comprise a plurality of UE data structures UEDS and two event queues EQ-HI and EQ-LO. Herein, a UE data structure may comprise a plurality of physical channel cyclic buffers to store packets of different physical channels but of the same UE. An event queue may be a cyclic buffer storing event descriptors which indicate the UEID of the UE to which the descriptor belongs, an event type TYPE indicating to which type of event the event descriptor relates to, and one or more write pointers WP0, . . . , WP5, as is schematically indicated in FIG. 8.

The packet writer PW is configured to write the packets in the system memory SYSMEM using the plurality of UE data structures UEDS according to at least the UE identifier and the associated physical channel identifier of respective packets. The packet writer may thus select a UE data structure from a plurality of UE data structures residing in system memory SYSMEM according to the UE identifier as the UE data structure for the UE and select the physical channel cyclic buffer that the packet belongs to from the plurality of physical channel cyclic buffers according to the physical channel identifier. The selection may further be based on additional criteria.

The event descriptors may be associated with certain event types, such as, e.g., a detection of a last pilot symbol allowing to trigger a channel estimation procedure by the DSP. Hereto, the front end processor FE may be further configured to determine, for soft symbols, a symbol descriptor in accordance to a description scheme and to provide the symbol descriptors together with the soft symbols to the packet generator PG. The symbol descriptor may be associated with finger-specific data, such as finger index to allow locating the soft symbol at the correct place in the packet data buffer PDB, and packet-specific data that is common to all soft symbols of one packet (i.e., from all fingers assigned), such as symbol type and symbol index in the slot.

The packet generator PG may be configured to receive the symbol descriptors together with the soft symbols from the front end processor FE, to determine an event type from the symbol descriptors, and to attach the event type to the respective packet, e.g., in the packet header fifo PHF. The event type may, e.g., correspond to the symbol descriptor of the last soft symbol of a packet. The packet generator PG may hereto ignore the symbol descriptors of all but the last soft symbol of a packet. The packet writer PW may be configured to determine event descriptors for respective packets indicating at least the respective symbol index, event type, UE identifier and physical channel, and to write the event descriptors into an event queue in the system memory SYSMEM. In an example, all packets are written with event descriptors. In another example, event descriptors are written for part of the packets.

The front end processor FE may be configured to, in determining the symbol descriptor in accordance to the description scheme determine the symbol descriptor in dependence on the respective symbol index. For example, for allowing this type of events, the attributes in the UE table may support multiple fields, one per event type, which can be filled by the DSP with a number from 0 to 9 to indicate the symbol index in which a respective event type is generated, or can be configured with number great than 9 to disable the event type. The user, for example, can set event type 0 on symbol #4 and event type 1 on symbol #9. With this configuration two event descriptors will be generated for this UE per slot, first after writing the first 5 symbols of the slot and the other after writing the last 5 symbols of the slot. This allows the user to program a scheduling scheme which is not based on DPCCH SLF.

The front end processor FE may be configured to, in determining the symbol descriptor in accordance to the description scheme, determine whether the soft symbol is associated with a control information of the associated physical channel and determining the symbol descriptor in dependence on the control information. For example, the physical layer may correspond to an uplink DPCCH which is used to carry control information generated at Layer 1. The Layer 1 control information consists of known pilot bits to support channel estimation for coherent detection, transmit power-control (TPC) commands, feedback information (FBI), and an optional transport-format combination indicator (TFCI). As PILOT symbols are used for channel estimation, which may be done once the last PILOT symbol of the DPCCH channel arrives and the channel estimation may be required to be completed with minimum latency, the arrival of the last pilot symbol may trigger latency critical processing by providing the event descriptor accordingly. For example, to trigger channel estimation, the packet generator PG may determine the event type to indicate accordingly by determining from the symbol descriptors that the soft symbols of the packet are associated with such last PILOT symbol of a DPCCH slot format.

The packet writer PW may be configured to select the event queue from a plurality of event queues EQ_HI, EQ_LO in the system memory SYSMEM in dependence on at least the respective event descriptor. For example, a first event queue EQ_HI may comprise all event descriptors relating to channel estimation, such as the last pilot events, whereas a second event queue may comprise all other events. The digital signal processor DSP may then prioritize the processing of the last pilot events by check the first event queue EQ_HI for the presence of any new event descriptors.

The packet writer PW may e.g. be configured to select the event queue according to a priority level associated with the respective event descriptor.

The packet writer PW may alternatively or additionally be configured to select event queue according to a UE group GRP1, GRP2 (see also FIG. 9). Hereby, different UEs may be divided over different UE groups, which may e.g. facilitate to allocate a first process on the DSP to process packets from users of a first UE group and a second process on the same, or another, DSP to process packets from users of a second UE group. The first and second processes may e.g. correspond to different priorities, or to different types of processing. The communication device may comprise at least one further digital signal processor (not shown), and, the packet writer PW may be configured to, in selecting the event queue, select the event queue to allocate processing the packet to one of the digital signal processors DSP.

An example of the operation of a base station according to an embodiment will be described with reference to FIG. 3-FIG. 10.

Figure 3:
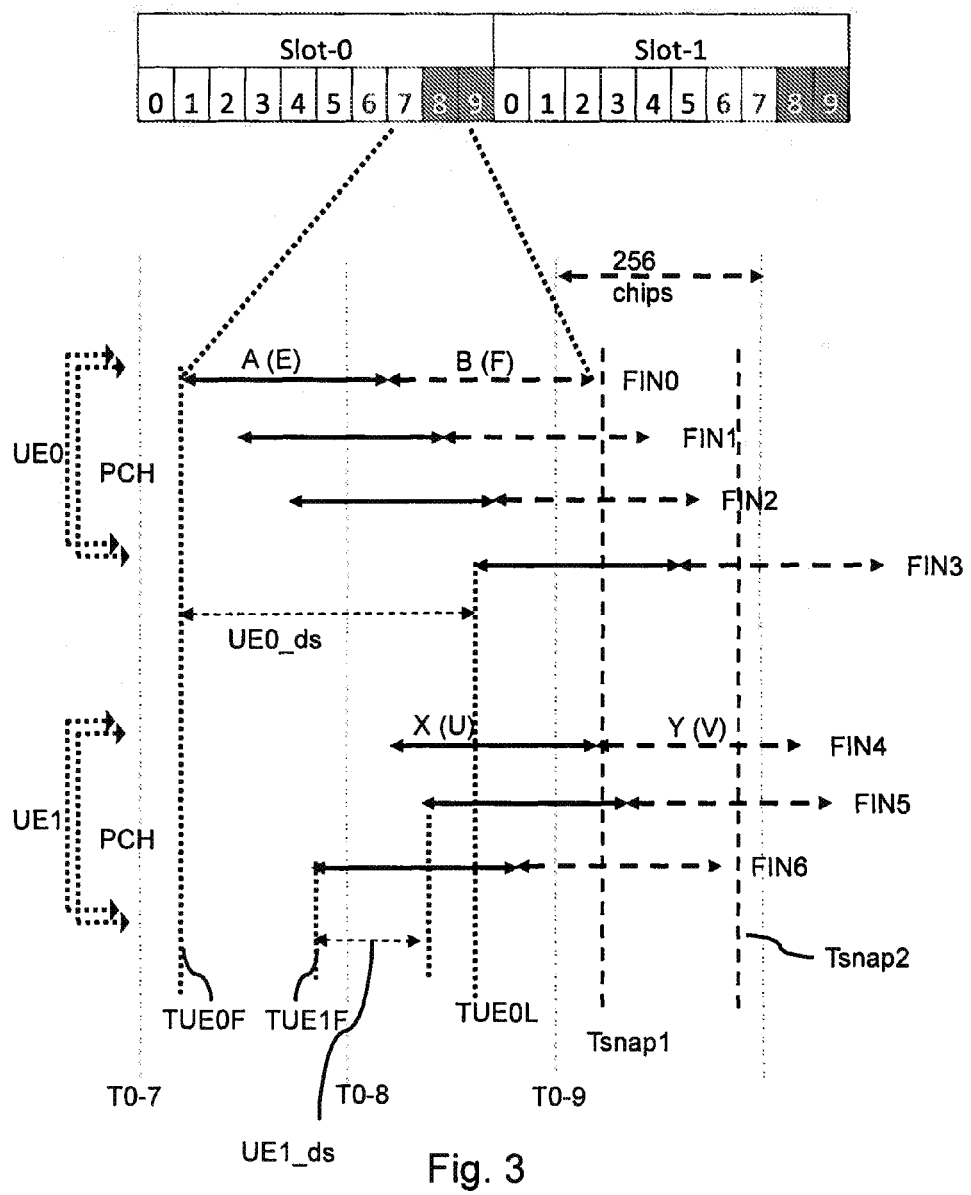
FIG. 3 indicates an example where a base station receives multiple reflections of signals transmitted by two UEs.

FIG. 3 indicates an example where a base station is in communication with a first UE UE0 and a second UE UE1 using two physical channels PCH0, PCH1 for each UE. Four fingers FIN0, FIN1, FIN2, FIN3 are assigned to handle the reflections from UE0 and its offsets determined using a path search. Each finger is configured to process physical channels PCH0 and PCH1 in parallel. Three fingers FIN4, FIN5, FIN6 are assigned to handle the reflections from UE1 and its offsets determined using a path search. FIG. 3 indicates that symbols A and B of physical channel PCH0 and symbols E and F of physical channel PCH1 are being received from UE0 corresponding to sub-slot 7 and 8 of a slot labelled Slot-0 with a delay spread UE0_ds between the earliest and the last finger assigned to UE0. FIG. 3 further indicates that symbols X and Y of physical channel PCH0 symbols U and V of physical channel PCH1 are being received from UE1 with a delay spread UE1_ds between the earliest and the last finger assigned to UE1. Symbol periods according to a base station time are indicated with vertical lines and labels T0-7, T0-8, T0-9. The length of a symbol period of 256 chips is also indicated.

FIG. 3 indicates that, for UE0, a first chip of symbol A is received by earliest finger FIN0 at time TUE0F and that the corresponding first chip of symbol A is received by last finger FIN3 at the delay spread UE0_ds later, indicated as time TUE0L. FIG. 3 indicates that, for UE1, a first chip of symbol X is received by earliest finger FIN6 at time TUE01F and that the corresponding first chip of symbol X is received by last finger FIN4 at the delay spread UE1_ds later.

The situation will now be described at a first snapshot moment Tsnap 1 and at a second snapshot moment Tsnap2.

As can be seen in FIG. 3, at the first snapshot moment Tsnap 1, finger FIN0 has already received all chips associated with symbol A and all chips associated with symbol B and has descrambled and despread the chips to obtain a soft symbol A and a soft symbol B for UE0 for this finger and for physical channel PCH0. Finger FIN1 has already received all chips associated with symbol A and is still active in receiving chips associated with symbol B and has descrambled and despread the chips to obtain a soft symbol A but not yet a soft symbol B for UE0 for this finger. Finger FIN2 has already received all chips associated with symbol A and is still active in receiving chips associated with symbol B and has descrambled and despread the chips to obtain a soft symbol A but not yet a soft symbol B for UE0 for this finger. Finger FIN3 is still active in receiving chips associated with symbol A and has not yet received chips associated with symbol B. The skilled person will appreciate that corresponding symbols X and Y of physical channel PCH1 are received simultaneously.

For UE1, at the first snapshot moment Tsnap 1, finger FIN6 is the earliest finger and finger FIN6 has already received all chips associated with symbol X and is active receiving chips associated with symbol B, and has descrambled and despread the chips to obtain a soft symbol X for UE1 for this finger and for physical channel PCH0. Finger FIN4 has just received all chips associated with symbol X and has just started receiving chips associated with symbol B, and has descrambled and despread the chips to obtain a soft symbol X for UE1 for this finger and for physical channel PCH0. Finger FIN5 is still active receiving all chips associated with symbol X.

FIG. 4a shows parts of the Packet Data Buffer PDB at the first snapshot moment Tsnap1. As indicated in FIG. 4a, the packet generator PG has written the soft symbols A, B, X and U as far as already obtained for all fingers in the packet data buffer PDB at the first snaphot moment Tsnap1. A PDB write pointer, indicated with the arrow, indicates empty space where future packets may be written. The packet generator PG hereby operates the packet data buffer PDB as a fifo for, in this example, keeping information associated with the packets for all UEs. At the first snapshot moment Tsnap 1 in the example, the packet data buffer PDB keeps information of a two packets P1 and P2 for UE0, and of a single packet P1' for UE1.

Figures 5A, 5B, 6A, 6B:
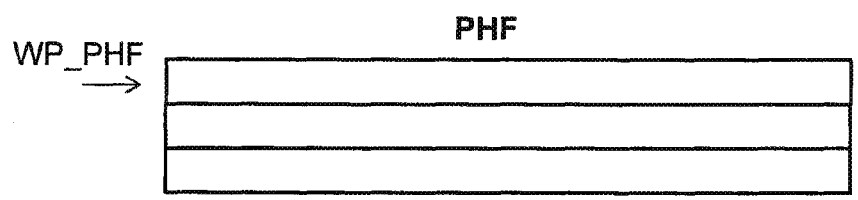
FIG. 5a and FIG. 5b shows an example of parts of a packet generation table PGT at the two snapshot moments.
FIG. 6a and FIG. 6b shows an example of parts of packet header fifo PHF at the two snapshot moments.

FIG. 5a shows parts of the Packet Generation Table PGT at the first snapshot moment Tsnap1. As indicated in FIG. 5a, the packet generator PG has written status information in the packet generation table PGT, indicating for the first UE UE0 the base addresses Base001 and Base002 of the two packets, number of soft symbols written for each packet. I.e., at the first snapshot moment Tsnap1, the status information indicates a '3' for the first packet P1, indicating that the soft symbols for three fingers have been written, whereas the soft symbol for the one more finger still needs to be written to complete the packet; and a '1' for the second packet P2, indicating that the soft symbols for one finger have been written, whereas the soft symbol for the other three fingers still needs to be written to complete the packet. Indications for the second UE UE1 are made similarly. For the second UE UE1, only soft symbols for one packet P1' have been written at the first snapshot moment Tsnap1, indicted with base address Base001 and a '2' indicating that the soft symbols for two fingers have been written. It will be appreciated that the plurality of physical channels and the number of fingers assigned to a UE may be available from the UE table. Comparing the finger count in the packet generation table PGT with the plurality of fingers assigned to a UE may be used by the packet generator PG to determine if the current finger is a first finger of a packet, a non-first and non-last finger of a packet or a last finger of a packet. For the first finger of a packet, the packet generator PG allocates a new buffer in PDB, and store the base address and new finger count in the packet generation table PGT. For non-first and non-last finger of a packet, the packet generator PG increments the finger count in the packet generation table PGT. For a last finger of a packet, the packet generator PG resets the finger count in the packet generation table PGT and pushes the packet attributes to the packet header fifo PHF.

In order to support multiple packets simultaneously, the packet generation table PGT has multiple entries per UE. The number of entries per UE is dictated by the maximum delay spread allowed in the system. For the example described in FIG. 3, the packet generation table PGT requires two entries per UE to allow handling up-to two concurrent packets. A PGT pointer and the offset of the finger currently being written to the packet generator PG are used to access the appropriate entry in the packet generation table PGT. The PGT pointer points on the appropriate PGT entry for fingers with offset less than 256 chips. The PGT pointer progresses (in cyclic fashion) every sub-slot. When symbol B(F) of UE0 FIN2 arrives, the packet generator PG selects the second entry dedicated for UE0 in PGT as indicated by the PGT pointer. When symbol A(E) of UE0 FIN3 arrives, the packet generator PG selects the first entry dedicated for UE0 in the packet generation table PGT since the offset of FIN3 is greater than 256 which indicates that FIN3 is a delayed finger which requires selecting the PGT entry currently not being pointed to by PGT pointer. It can be appreciated that the PGT pointer may be global for all the UEs.

FIG. 6a shows parts of the Packet header fifo PHF at the first snapshot moment Tsnap1. As indicated in FIG. 6a, the packet generator PG has not yet indicated in the Packet header fifo PHF that the packet data buffer PDB does not have any complete packets associated with A, B, X or Y at the moment. The skilled person will appreciate that the Packet header fifo PHF may indicate complete packets received earlier.

As can be seen in FIG. 3, at the second snapshot moment Tsnap2, all soft symbols A have been received for UE0 and the corresponding first packet is complete, as is the case for all soft symbols X. This is also reflected in FIG. 4b, FIG. 5b and FIG. 6b.

FIG. 4b shows parts of the Packet Data Buffer PDB, FIG. 5b shows parts of the Packet Generation Table PGT and FIG. 6b shows parts of the Packet header fifo PHF at the second snapshot moment Tsnap2. The meaning of the entries shown in FIG. 4b and FIG. 5b will be clear from the description of FIG. 4a and FIG. 5a above. It will be understood that, for the second UE UE1, buffer space has been allocated in the Packet Data Buffer PDB for storing soft symbols of a new, second packet P2' upon a first arrival of a Y-symbol, while X-symbols were still being written, and that, at the second snapshot moment Tsnap2, soft symbols received for finger FIN6 from second packet P2' have been written into the Packet Data Buffer PDB. FIG. 6b shows that, at the second snapshot moment Tsnap2, the packet header fifo PHF indicates the access information by giving the address of the available packets in the packet data buffer PDB, the UEID, the number of fingers and an event type, as, for UE0, PDBbase(UE0, P1)={Base001, UE0, 4, Evt_typ0} and, for UE1, PDBbase (UE0',P1')={Base011, UE1, 3, Evt_typ1}. It will be appreciated that the number and type of physical channels used by a UE may be available from UE configuration attributes in the UE table, or may alternatively be included in and retrieved from the packet header fifo PHF. The event type was determined by the packet generator PG from the symbol descriptors received, together with the soft symbols, from the front end processor FE. The event type could e.g. indicate that the packet relates to a pilot event where the soft symbols of the packet correspond to pilot symbols, or another type of control information symbol.

After the packet generator PG has indicated in the packet header fifo PHF that a packet is available in the packet data buffer, the packet writer PW may copy the packet from the packet data buffer PDB into a UE data structure UEDS in the system memory SYSMEM., Thus, the indications shown in FIG. 6b will let the packet writer PW copy the packet with all four soft symbols A for the first physical channel from UE0 and the packet with all four soft symbols E for the second physical channel from UE0, as well as the packet with all three soft symbols X for the first physical channel from UE1 and the packet with all three soft symbols U for the second physical channel from UE1 from the packet data buffer PDB into the system memory SYSMEM.

The packet writer PW retrieves the event type from the packet header fifo PHF and may generate an event descriptor accordingly. For the example above, the event descriptor may indicate the event type, the UEID, and two write pointers referring to the corresponding memory locations in the system memory SYSMEM of the packets of the first and second physical channels. For example, for UE0 and where the first physical channel PCH0 was a DPCCH channel and the second physical channel PCH1 was a E-DPCCH channel, and symbol A relates to a pilot symbol, the event type would be a pilot type, one write pointer would refer to the memory location of packet A and the other write pointer would refer to the memory location of packet E. The event descriptor may accommodate for a larger number of physical channels. In a further embodiment, the packet writer PW may write at least part of the packets into system memory SYSMEM without an event descriptor, such that there is no associated signalling to the digital signal processor DSP of arrival of new packets in the system memory SYSMEM. Hereby, the number of events per UE in a slot may be smaller than the number of sub-slots in a slot, which may improve the efficiency of the digital signal processor DSP. For example, if the slot format dictates six pilot symbols, then for the first five packets with pilot symbols, the packet writer PW may only copy the packets itself to system memory SYSMEM without interfering the DSP and only write the event descriptor indicating a pilot event upon writing the sixth packet with pilot symbols into the system memory, and the DSP will then only be interrupted to process all the packets written to system memory SYSMEM. The number of interrupts of the digital signal processor DSP may accordingly be smaller than one interrupt per sub-slot, as would be the case in known systems.

FIG. 7 shows an exemplary structure of an Event Descriptor ED. The exemplary structure is capable to comprise write pointers for to up to six physical channel cyclic buffers of a UE data structure, corresponding to up to six physical channels that were handled simultaneously (similar as PCH0 and PCH1 in the example above). The event descriptor ED thereto comprises fields for a TYPE indication, a UEID and six write pointers WP0, WP1, WP2, WP3, WP4, WP5. The six write pointers may e.g. correspond to six physical channel cyclic buffers corresponding to different physical channels, e.g. physical channels respectively comprising respectively DPCCH on-time packets, DPCCH E/L packets (early packet followed by a late packet), E-DPCCH, HS-DPCCH packets (two consecutive packets in case the spreading factor is 128), GPCH0 packets of a first General Purpose Channel and GPCH1 packets of a second General Purpose Channel. When writing the packet in a UE data structure, and if an event descriptor exists for the packet, the packet writer PW may also write the event descriptor in an event queue in system memory SYSMEM. Referring back to our example, the packet writer PW would write the event descriptor with the pilot type indication in the high priority event queue EQ_HI to allow the digital signal processor to process the associated pilot event with a low latency. Multiple event queues may thus be used to, e.g., relate to different priority levels. In an alternative embodiment, the communication device only has a single event queue, wherein the events are indicated in order of arrival. In an embodiment, multiple event queues are provided to accommodate for different UE groups.

FIG. 8 schematically shows an event queue EQ. The event queue EQ has a write pointer WP_EQ, and is arranged to sequentially store a one or more event descriptors. The event queue thus represents a queue of events for processing by the digital signal processor.

FIG. 9 shows an example of a plurality of UE groups in system memory SYSMEM. The example has two UE groups GRP1, GRP2. The first UE group GRP1 is handled by a first DSP and the second UE group GRP2 is handled by a second DSP. Each UE group accommodates a plurality of two event queues EQ1, EQ2 and a plurality of n UE data structures UEDS1, UEDS2, UEDSn, where the number of UE data structures is sufficiently large to accommodate for a sufficiently large maximum number of UEs. The first event queue EQ1 of each UE group corresponds to a high priority event queue, e.g. comprising all last pilot events, whereas the second event queue corresponds to a low priority event queue. The system memory SYSMEM thus comprises in total four events queues: two associated with the first user group GRP1 and two associated with the second user group GRP2.

In an embodiment, the communication device comprises a system memory accommodating 512 UE data structures, each UE data structure comprising 6 physical channel cyclic buffers associated with 6 physical channels, 18 event queues to store the event descriptors, each event descriptor having a UEID and 6 WPs, where all 512 UE data structures and 18 event queues are divided in 6 groups to be processed by 6 digital signal processors.

Figure 10:
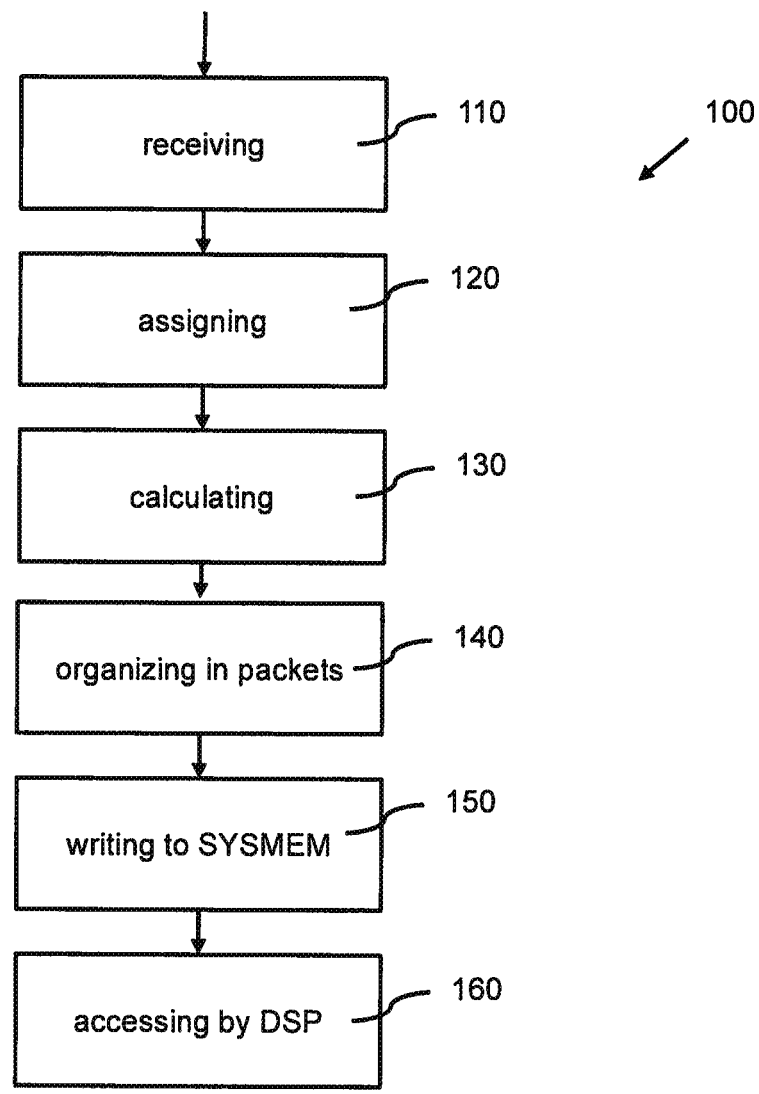
FIG. 10 schematically shows a method according to an example of an embodiment.

FIG. 10 schematically shows a method of receiving multiple streams, each being a superposition of a plurality of reflections of a signal transmitted by one or more UEs with a communication device for a wideband code division multiple access communication (W-CDMA) system. The signal comprises scrambled and spreaded symbols associated with one or more physical channels per UE. The communication device comprises an antenna interface AIF, a system memory SYSMEM and one or more digital signal processors DSP1, DSP2. As shown in FIG. 11, the method comprises receiving 110, by the antenna interface AIF, one or more antenna signals comprising the superposition of the plurality of reflections of the signal transmitted by one or more UEs. The method further comprises determining 120 a number of fingers corresponding to the plurality of reflections of each UE and to assign a plurality of fingers to each UE in accordance with the number. The method further comprises calculating 130 soft symbols representing the symbols transmitted by one or more UEs using descrambling and despreading of the one or more antenna signals using the plurality of fingers assigned to each UE, each soft symbol being associated with a respective symbol index, UE identifier, finger index and physical channel identifier. Next, the method comprises organizing 140 the soft symbols into packets, each packet comprising the soft symbols from the plurality of fingers assigned to a respective UE associated with one physical channel of the one of more physical channels and with the same symbol index. Subsequently, the method comprises writing 150 the packets into the system memory SYSMEM to allow the one or more digital signal processor DSP to access the packets from the system memory SYSMEM and to process the packets. Next, the method may comprise processing 160 the packets by the one or more digital signal processors DSP.

Writing 150 the packets into the system memory may comprise selecting a UE data structure from a plurality of UE data structures in the system memory according to at least the UE identifier and the associated physical channel identifier of respective packets; and writing the packets in the selected UE data structure.

The method may further comprise selecting, by one of the one or more digital signal processors, a UE data structure and processing the packets written in the system memory of the selected UE data structure.

The method may comprise determining, for the soft symbols, respective symbol descriptors in accordance to a description scheme; determining event types for packets from the symbol descriptors of the soft symbols of the respective packet; determining event descriptors for respective packets indicating at least the respective symbol index, event type, UE identifier and physical channel identifier; and writing the event descriptors into an event queue in the system memory SYSMEM.

The method may comprise selecting, by one of the one or more digital signal processors, an event queue from the plurality of event queues and processing the packets written in the system memory for the selected event queue.

The method may further comprise further actions described in relation to any one of FIG. 2-FIG. 10.

The method may be provided, in part or in full, as a series of instructions to form a computer program product. A computer program product may thus be provided arranged to, when loaded in the memory of a programmable processor, allow the programmable processor to execute at least part of a method according to an embodiment.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a data carrier, such as a CD-rom or diskette, stored with data loadable in a memory of a computer system, the data representing the computer program. The data carrier may further be a data connection, such as a telephone cable or a wireless connection.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be an type of connection suitable to transfer signals from or to the respective nodes, units or devices, for example via intermediate devices. Accordingly, unless implied or stated otherwise the connections may for example be direct connections or indirect connections.

Because the apparatus implementing the present invention is, in part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIG. 2 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. Also, devices functionally forming separate devices may be integrated in a single physical device.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases one or more or at least one and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A communication device for a wideband code division multiple access communication (W-CDMA) system, the communication device comprising:
an antenna interface, a controller, a front end processor, a packet generator, a packet writer and one or more digital signal processors;
wherein the antenna interface is configured to receive one or more antenna signals comprising a superposition of a plurality of reflections of a signal transmitted by one or more UEs, the signal comprising scrambled and spreaded symbols associated with one or more physical channels per UE, and to provide the one or more antenna signals to the front end processor;
wherein the controller configured to determine a number of fingers corresponding to the plurality of reflections and to assign a plurality of fingers to a UE in accordance with the number,
wherein the front end processor is configured to receive the one or more antenna signals, to calculate soft symbols representing the symbols transmitted by the UE using descrambling and despreading of the one or more antenna signals using the plurality of fingers assigned to the UE, each soft symbol being associated with a respective symbol index, UE identifier, finger index and physical channel identifier, and to provide the soft symbols to the packet generator;
wherein the packet generator is configured to receive the soft symbols from the front end processor and to organize the soft symbols into packets, each packet comprising the soft symbols from the plurality of fingers assigned to a respective UE associated with one physical channel of the one of more physical channels and with the same symbol index;
wherein the packet writer is configured to write the packets into a system memory; and
wherein the one or more digital signal processors is configured to access the packets from the system memory and to process the packets.

2. A communication device according to claim 1, comprising a packet data buffer, the packet generator, in organizing the soft symbols into packets, being configured to:
allocate a first buffer space in the packet data buffer according to the assigned number of fingers upon receiving a first soft symbol of a first packet, and
write the soft symbols of the first packet in the first buffer space of the packet data buffer until the first packet is complete.

3. A communication device according to claim 2, further comprising a packet header fifo,
the packet generator further configured to indicate access information of the first buffer space of the packet data buffer in the packet header fifo upon completing the writing of soft symbols into the first buffer space of the packet data buffer,
the packet writer being configured to read the access information from the packet header fifo, to read the first packet from the first buffer space using the access information and to write the first packet in the system memory.

4. A communication device according to claim 3, the packet writer further configured to, for each packet, select a UE data structure from a plurality of UE data structures in the system memory according to the UE identifier and select a physical channel cyclic buffer from a plurality of physical channel cyclic buffers in the selected UE data structure according to the physical channel identifier of the packet, and to write the packet in the selected physical channel cyclic buffer of the selected UE data structure.

5. A communication device according to claim 2, further comprising a packet generation table,
the packet generator further configured to allocate a second buffer space in the packet data buffer upon a first receipt of a soft symbol of a second packet, to write the soft symbols of the second packet in the second buffer space of the packet data buffer until the second packet is complete, and to indicate status information representing the status of the first buffer space and the second buffer space in the packet generation table.

6. A communication device according to claim 2, the packet writer further configured to, for each packet, select a UE data structure from a plurality of UE data structures in the system memory according to the UE identifier and select a physical channel cyclic buffer from a plurality of physical channel cyclic buffers in the selected UE data structure according to the physical channel identifier of the packet, and to write the packet in the selected physical channel cyclic buffer of the selected UE data structure.

7. A communication device according to claim 1, the packet writer further configured to, for each packet, select a UE data structure from a plurality of UE data structures in the system memory according to the UE identifier and select a physical channel cyclic buffer from a plurality of physical channel cyclic buffers in the selected UE data structure according to the physical channel identifier of the packet, and to write the packet in the selected physical channel cyclic buffer of the selected UE data structure.

8. A communication device according to claim 1 wherein:
the front end processor is further configured to determine, for at least part of the soft symbols in a slot, a symbol descriptor in accordance to a description scheme and to provide the symbol descriptors together with the soft symbols to the packet generator;
the packet generator is configured to receive the symbol descriptors together with the soft symbols from the front end processor, to determine an event type from the symbol descriptors, and to attach the event type to the respective packet;
the packet writer is configured to determine event descriptors for respective packets indicating at least the respective symbol index, event type, UE identifier and physical channel identifier, and to write the event descriptors into an event queue in the system memory.

9. A communication device according to claim 8, the front end processor being configured to, in determining the symbol descriptor in accordance to the description scheme, determine the symbol descriptor in dependence on the respective symbol index.

10. A communication device according to claim 8, the front end processor being configured to, in determining the symbol descriptor in accordance to the description scheme, determine whether the soft symbol is associated with a control information of the associated physical channel and determining the symbol descriptor in dependence on the control information.

11. A communication device according to claim 8, the packet writer configured to select the event queue from a plurality of event queues in the system memory in dependence on at least the respective event descriptor.

12. A communication device according to claim 11, the packet writer configured to select the event queue according to a priority level associated with the respective event descriptor.

13. A communication device according to claim 8, the packet writer configured to select the event queue according to a UE group.

14. A communication device according to claim 8, comprising at least one further digital signal processor, the packet writer configured to, in selecting the event queue, select the event queue to allocate processing the packet to one of the digital signal processor and the at least one further signal processor.

15. A communication device according to claim 1, the communication device being a base station.

16. A method of receiving a superposition of a plurality of reflections of a signal transmitted by one or more UEs with a communication device for a wideband code division multiple access communication system, the signal comprising scrambled and spreaded symbols associated with one or more physical channels, the communication device comprising an antenna interface, a system memory and one or more digital signal processors, the method comprising:
receiving, by the antenna interface, one or more antenna signals comprising the superposition of the plurality of reflections of the signal transmitted by one or more UEs;
determining, for each UE, a number of fingers corresponding to the plurality of reflections and to assign a plurality of fingers to each of the UEs in accordance with the number,
calculating soft symbols representing the symbols transmitted by the UEs using descrambling and despreading of the one or more antenna signals using the plurality of fingers assigned to the UEs, each soft symbol being associated with a respective symbol index, UE identifier, finger index and physical channel identifier;
organizing the soft symbols into packets, each packet comprising the soft symbols from the plurality of fingers assigned to a respective UE associated with one physical channel of the one of more physical channels and with the same symbol index;
writing the packets into the system memory to allow the one or more digital signal processors (DSP1, DSP2) to access the packets from the system memory and to process the packets.

17. A method according to claim 16, the writing the packets into the system memory comprising, for each packet:
selecting a UE data structure from a plurality of UE data structures in the system memory according to the UE identifier and selecting a physical channel cyclic buffer from a plurality of physical channel cyclic buffers in the selected UE data structure according to the physical channel identifier of the packet, and
writing the packet in the selected physical channel cyclic buffer of the selected UE data structure.

18. A method according to claim 16, the method comprising:
selecting, by the digital signal processor, a UE data structure and processing the packets written in the system memory of the selected UE data structure.

19. A method according to any one of claim 16, the method comprising:
determining, for the soft symbols, respective symbol descriptors in accordance to a description scheme,
determining event types for packets from the symbol descriptors of the soft symbols of the respective packets,
determining event descriptors for respective packets indicating at least the respective symbol index, event type, UE identifier and physical channel identifier, and
writing the event descriptors into an event queue in the system memory.

20. A method according to claim 19, the method comprising:
selecting, by one of the one or more digital signal processors, an event queue from the plurality of event queues and processing the packets written in the system memory for the selected event queue.

* * * * *